US009715293B2

(12) United States Patent
Chung (10) Patent No.: US 9,715,293 B2
(45) Date of Patent: Jul. 25, 2017

(54) LIQUID CRYSTAL DISPLAY DEVICE INTEGRATED WITH TOUCH SENSOR

(71) Applicant: Samsung Display Co., Ltd., Yongin, Gyeonggi-Do (KR)

(72) Inventor: Jae-Mo Chung, Yongin (KR)

(73) Assignee: Samsung Display Co., Ltd. (KR)

( * ) Notice: Subject to any disclaimer, the term of this patent is extended or adjusted under 35 U.S.C. 154(b) by 311 days.

(21) Appl. No.: 14/293,868

(22) Filed: Jun. 2, 2014

(65) Prior Publication Data

US 2015/0035766 A1 Feb. 5, 2015

(30) Foreign Application Priority Data

Aug. 1, 2013 (KR) ........................ 10-2013-0091479

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC .................................................... G06F 3/0412
See application file for complete search history.

(56) References Cited

U.S. PATENT DOCUMENTS

2010/0214248 A1* 8/2010 Takano ................. G06F 3/0412
345/173
2011/0216031 A1* 9/2011 Chen ....................... G06F 3/044
345/174

(Continued)

FOREIGN PATENT DOCUMENTS

KR 10-2012-0025923 A 3/2012
KR 10-2012-0045992 A 5/2012

*Primary Examiner* — Michael Faragalla
*Assistant Examiner* — Chayce Bibbee
(74) *Attorney, Agent, or Firm* — Innovation Counsel LLP (57) ABSTRACT

A liquid crystal display device includes as a monolithically integrated part thereof, a touch sensor that operates during a blanking period of the display device. In one embodiment, the LCD device includes a first substrate, a second substrate, a plurality of common electrodes, a plurality of sensing electrodes, a data driver, a gate lines driver, a common electrodes driver, a touch controller and a display controller. A plurality of pixels coupled to gate lines and data lines are formed on the first substrate. The second substrate is positioned opposite to the first substrate. The plurality of common electrodes corresponding to the respective pixels are formed on the second substrate. The plurality of sensing electrodes are also formed on the second substrate to cross with the common electrodes. The data lines driver outputs data signals to the data lines during a display period. The gate lines driver includes a plurality of stages receiving first and second clock signals. The gate lines driver outputs a gate-on signal to the gate lines during the display period, and outputs a gate-off signal to the gate lines during the blanking period. The common electrodes driver supplies touch driving signals to the common electrodes during a touch driving period included within the blanking period. The touch controller supplies the touch control signal to the common electrode driver during the touch driving period. The display controller supplies the first and second clock signals to the gate lines driver, in synchronization with the touch control signal, during the touch driving period.

17 Claims, 7 Drawing Sheets

(56) References Cited

U.S. PATENT DOCUMENTS

| | | |
|---|---|---|
| 2012/0056835 A1 | 3/2012 | Choo et al. |
| 2012/0105752 A1 | 5/2012 | Park et al. |
| 2013/0194033 A1* | 8/2013 | Murakami .......... H04L 25/0272 327/543 |
| 2014/0267349 A1* | 9/2014 | Lee ........................ G06F 3/044 345/589 |

* cited by examiner

LIQUID CRYSTAL DISPLAY DEVICE INTEGRATED WITH TOUCH SENSOR

RELATED APPLICATIONS

This application claims priority to and the benefit of Korean Patent Application No. 10-2013-0091479, filed on Aug. 1, 2013, in the Korean Intellectual Property Office, the entire contents of which application are incorporated herein by reference in their entirety.

BACKGROUND

1. Field

The present disclosure of invention relates to a liquid crystal display device integrated with a mutual capacitive touch sensor.

2. Description of Related Technology

As interest in information display devices increases and demand for portable information media also increases, corresponding research and commercialization on light, thin film type flat or alike panel display devices (FPD devices) replacing cathode ray tubes (CRTs) that are existing display devices is actively being conducted. Particularly, among these thin panel (e.g., FPD) devices, a liquid crystal display (LCD) device is a device which displays an image using optical anisotropy of liquid crystals. The LCD device is actively being applied to notebook computers, desktop monitors or the like because it has an excellent resolution, color rendering capability and picture quality.

As user's demands on the convenience of inputs increase, the LCD device also requires a touch screen function that enables a user's command to be input by selecting an instruction content displayed on a screen with a user's hand or other object having capacitive coupling ability.

SUMMARY

In accordance with the present disclosure of invention, there is provided a liquid crystal display (LCD) device having as a monolithically integrated part thereof, a touch sensor. The LCD device includes: a first substrate on which a plurality of pixels coupled to gate lines and data lines are formed; a second substrate positioned opposite to the first substrate and having disposed thereon; a plurality of common electrodes configured to correspond to the respective pixels and a plurality of sensing electrodes also formed on the second substrate. The LCD device includes a data lines driver configured to output data signals to the data lines during a display period; a gate lines driver configured to output gate-on signals to the gate lines during the display period, and to outputs a gate-off signal to the gate lines during a blanking period. The LCD device includes a common electrodes driver configured to supply touch driving signals to the common electrodes during a touch driving period included within the blanking period, and corresponding to a touch control signal; and also a touch controller configured to supply the touch control signal to the common electrodes driver during the touch driving period; and a display controller configured to supply the first and second clock signals to the gate lines driver, in synchronization with the touch control signal, during the touch driving period.

The blanking period and the display period may be alternately repeated.

The common electrodes driver may supply the same common voltage to the common electrodes during the display period.

The display controller may supply the first and second clock signals having a first frequency to the gate lines driver during the display period, and supply the first and second clock signals having a second frequency different from the first frequency to the gate lines driver during the touch driving period.

The blanking period may further include a margin subperiod in which the touch control signal is not supplied.

The margin period may be positioned between the display period and the touch driving period.

The display controller may supply the first and second clock signals having the first frequency to the gate lines driver during the margin period.

Each stage of the gate driver may include a first transistor coupled between a first clock terminal and an output terminal, the first transistor having a gate electrode coupled to a first node; a second transistor coupled between a first input terminal and the first node, the second transistor having a gate electrode coupled to the first input terminal; a third transistor coupled between the first node and a voltage terminal, the third transistor having a gate electrode coupled to a second input terminal; a fourth transistor coupled between the output terminal and the voltage terminal, the fourth transistor having a gate electrode coupled to a second clock terminal; a fifth transistor coupled between the output terminal and the voltage terminal, the fifth transistor having a gate electrode coupled to a second node; a sixth transistor coupled between the second node and the voltage terminal, the sixth transistor having a gate electrode coupled to the first node; and a seventh transistor coupled between the first node and the voltage terminal, the seventh transistor having a gate electrode coupled to the second node.

Each stage of the gate driver may further include a first capacitor coupled between the first node and the output terminal; and a second capacitor coupled between the first clock terminal and the second node.

The first and second clock signals may be respectively input to the first and second clock terminals of an odd-numbered stage. The second and first clock signals may be respectively input to the first and second clock terminals of an even-numbered stage.

A scan start signal or the gate-on signal of a previous stage may be input to the first input terminal. The gate-on signal of a next stage may be input to the second input terminal.

A gate-off voltage may be applied to the voltage terminal.

The second frequency may be a frequency lower than the first frequency.

The first and second clock signals may have phases opposite to each other.

The common electrodes may be positioned on the first or second substrate.

The common electrodes and the sensing electrodes may extend longitudinally in directions intersecting each other.

The LCD device may further include a back light unit positioned below the first substrate to provide light.

The LCD device may further include a liquid crystal layer positioned between the first and second substrates.

BRIEF DESCRIPTION OF THE DRAWINGS

Example embodiments will now be described more fully hereinafter with reference to the accompanying drawings; however, they may be embodied in different forms and should not be construed as limited to the embodiments illustrated herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, certain exemplary embodiments according to the present disclosure of invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the present teachings are omitted for clarity. Also, like reference numerals refer to like elements throughout.

Figure 1:
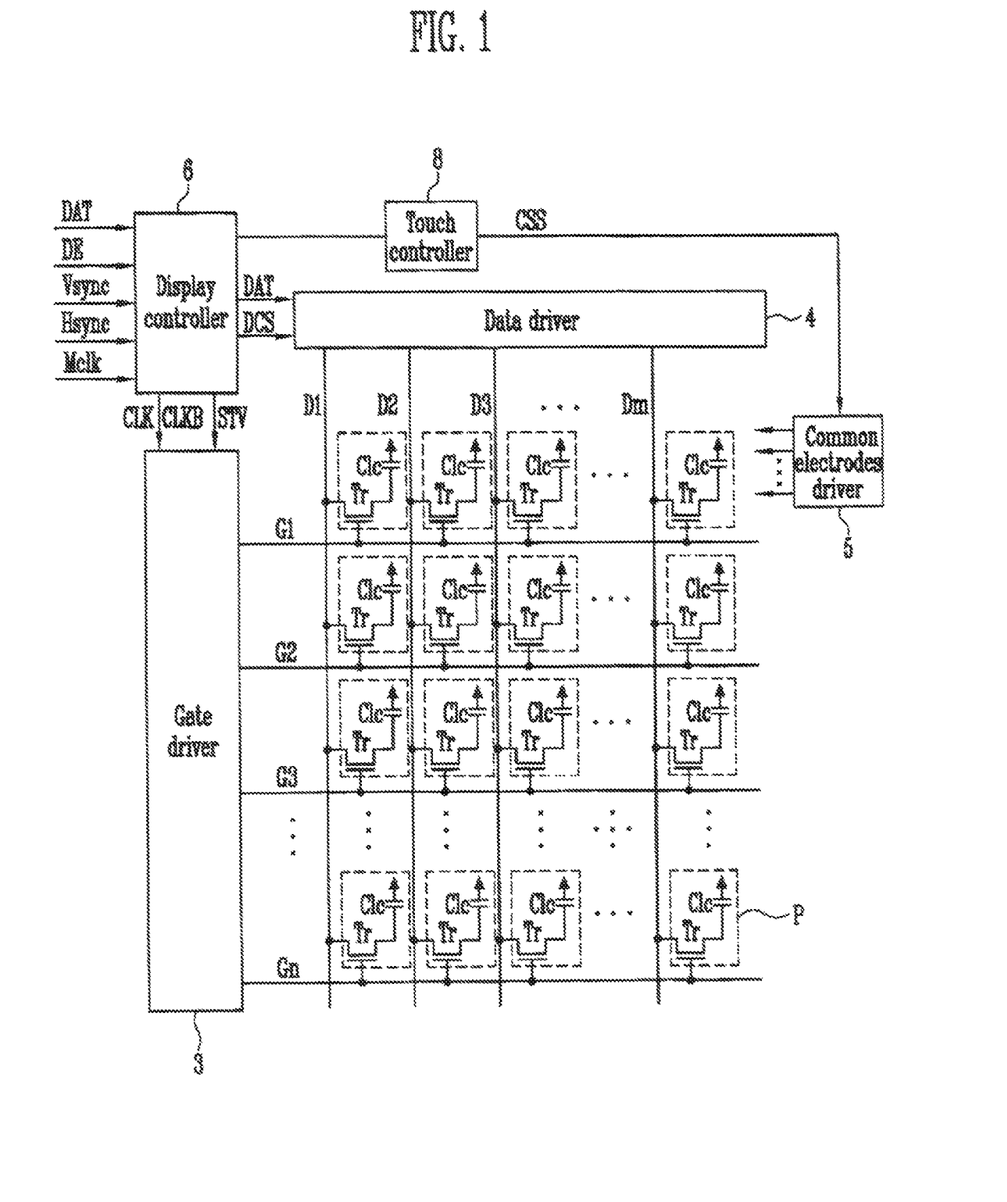
FIG. 1 is a block diagram illustrating a liquid crystal display (LCD) device that is monolithically integrated with a touch sensor apparatus in accordance with the present disclosure of invention.

FIG. 1 is a block diagram illustrating a liquid crystal display (LCD) device having monolithically integrated therewith a touch sensor according to an embodiment of the present disclosure. Particularly, a configuration for displaying an image of the LCD device will be mainly shown in FIG. 1.

Figure 2:
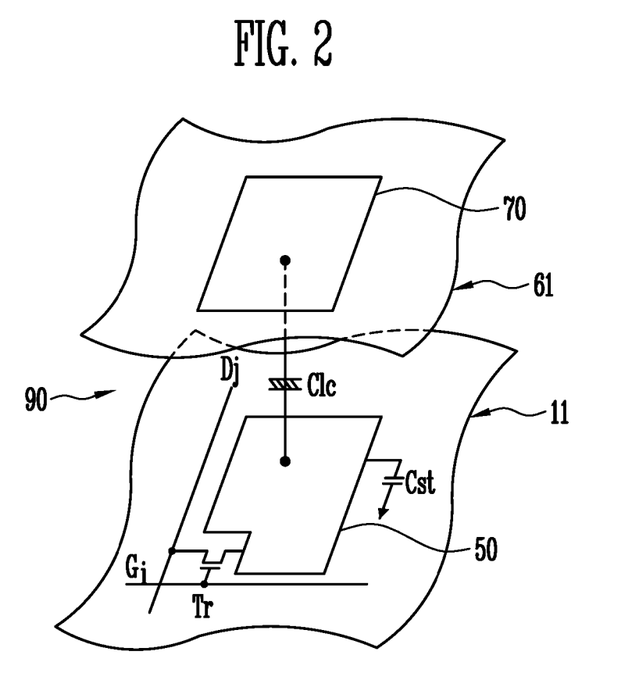
FIG. 2 is an equivalent circuit diagram of one of the light controlling pixels shown in FIG. 1.
Figure 3:
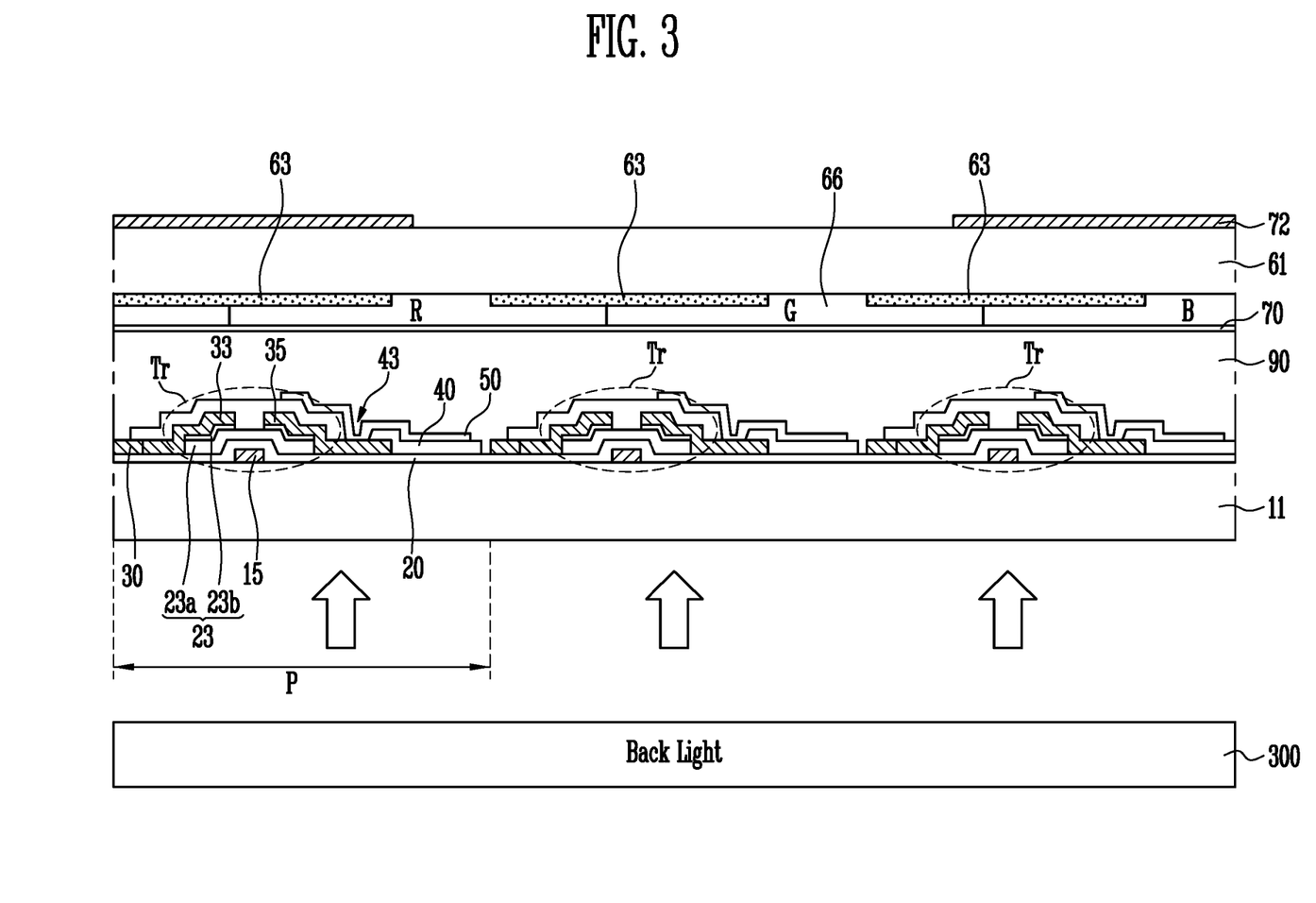
FIG. 3 is a sectional view illustrating a region of the LCD device according to an embodiment of the present disclosure wherein the common electrode plane is subdivided into a plurality of individually driven common electrodes.

FIG. 2 is an equivalent circuit diagram of a pixel shown in FIG. 1. FIG. 3 is a sectional view illustrating a region of the LCD device according to the embodiment.

Figure 4:
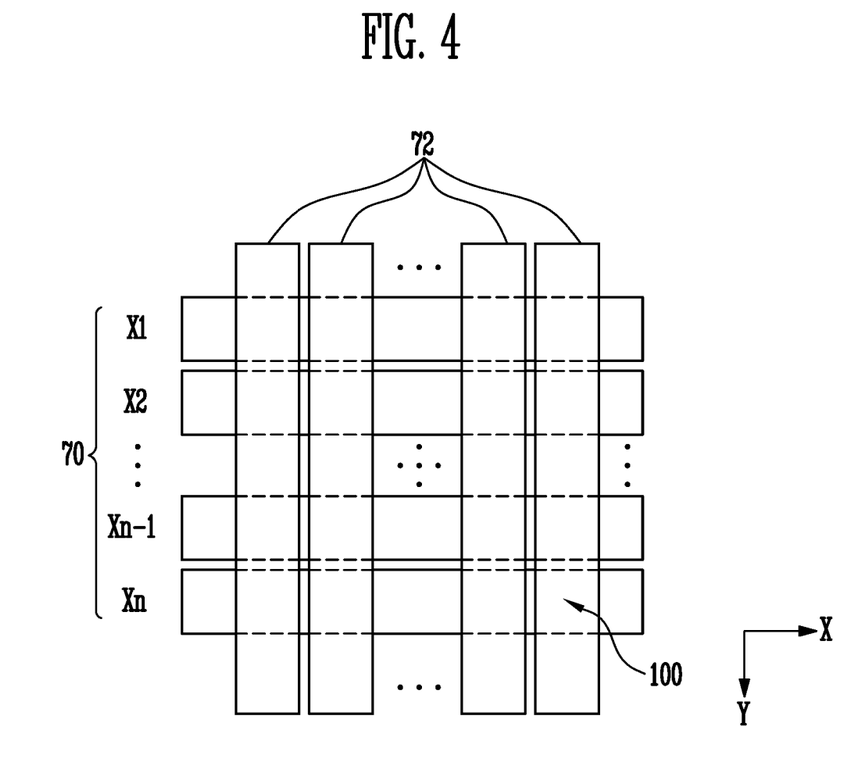
FIG. 4 is a top plan view illustrating a patterning of the common electrodes and a patterning of overlying sensing electrodes in accordance with one embodiment of the present disclosure.

FIG. 4 is a top plan view illustrating a possible patterning of the plural common electrodes and of the crossing therewith sensing electrodes according to an embodiment of the present disclosure.

As shown in FIG. 1, the LCD device according to one embodiment may include a gate lines driver 3 configured to supply corresponding gate signals to gate lines G1 to Gn where the latter are arranged to extend in a first direction (e.g., a horizontal X direction, a row direction). The LCD device further includes a data lines driver 4 configured to supply corresponding data signals to data lines D1 to Dm where the latter are arranged to extend in a second direction (e.g., a vertical Y direction, a column direction), the second direction crossing with the first direction. The LCD device further includes a plurality of pixels P respectively coupled to corresponding ones of the gate lines G1 to Gn and corresponding ones of the data lines D1 to Dm. Additionally, the LCD device includes a common electrodes driver 5 configured to control respective ones of plural and individually drivable common electrodes 70. Moreover, the LCD device includes a display controller 6 configured to control the gate lines driver 3 and the data lines driver 4, and a touch controller 8 configured to control the common electrodes driver 5.

The exemplary LCD device is a display apparatus which implements display of a desired image, using optical anisotropy and polarization properties of liquid crystals. The liquid crystals have optical anisotropy in which the molecular structure of the liquid crystals is thin and long and the alignment of the liquid crystals has electrically controllable directivity, and polarization properties in which the molecular arrangement of the liquid crystals has a direction changed depending on the size of the liquid crystals when the liquid crystals are placed in an electric field.

Accordingly, the LCD device includes a liquid crystal panel formed by joining together first and second light-passing substrates with pixel electrodes provided on one of the substrates, and a common electrodes plane provided on the spaced apart other of the substrates with a liquid crystal layer being interposed therebetween. In the LCD device, a predetermined electric field is formed by respectively applying a data signal and a common voltage respectively onto the pixel electrode and the associated common electrode. The utilized data signal is charged onto the pixel electrode when its respective pixel is selected by a gate signal and the desired data signal is then transmitted by way of the corresponding data line. As a result of the desired data being charged onto the pixel electrode and an opposed voltage (e.g., Vcom) being applied to the associated common electrode, the transmittance of light supplied from a backlighting unit to the pixel is controlled according to the arrangement angle of the liquid crystals of the pixel as controlled by the electric field formed in the pixel, thereby displaying part of a predefined image.

The LCD device may include, according to a desired method of controlling the alignment of the liquid crystal layer, a twisted nematic (TN) mode, a vertical alignment (VA) mode, an in-plane switching (IPS) mode, a plane-to-line switching (PLS) mode, etc.

Among these modes, the IPS or PLS mode is a method in which pixel electrodes 50 and a common electrode 70 are all disposed on a lower substrate (e.g., a first substrate 11), and thus the alignment of a liquid crystal layer is controlled by an electric field between the pixel electrodes 50 and the common electrode 70.

Although it has been illustrated as an example in FIG. 2 that the common electrodes 70 are positioned on the upper or second substrate 61, it will be apparent from the following description that the present teachings may be applied in the IPS or PLS mode in which the plurality of common electrodes 70 are positioned, together with the pixel electrodes 50, on the first or lower substrate 11.

To this end, referring to the embodiment shown in FIGS. 2 and 3, the LCD device has a configuration in which the first and second substrates 11 and 61 are jointed together while remaining spaced apart and facing each other. In this case, the gate lines G1 to Gn and the data lines D1 to Dm cross each other (for example at right angles). The gate lines G1 to Gn are respectively arranged on the lower first substrate 11, and transistors Tr are respectively provided also in the lower first substrate 11 and disposed at intersection points of the gate lines G1 to Gn and the data lines D1 to Dm, so as to be coupled one by one to respective ones of the pixel electrodes 50 formed in the corresponding pixels P.

This will be described in detail with reference to FIG. 2. The pixel P coupled to an i-th gate line Gi and a j-th data line Dj may include a transistor Tr coupled to the i-th gate line Gi and the j-th data line Dj, a pixel electrode 50 coupled to the transistor Tr, a liquid crystal capacitor Clc formed to be positioned between the pixel electrode 50 and an associated common electrode 70, and a storage capacitor Cst.

In this case, the storage capacitor Cst may be omitted if so desired.

The transistor Tr, as shown in FIG. 3, may be configured to include a gate electrode 15 coupled to a gate line, source/drain electrodes 33 and 35, and a semiconductive layer 23 formed between the gate electrode 15 and the source/drain electrodes 33 and 35. Here, the semiconductive layer 23 may include an active layer 23a and an ohmic contact layer 23b. The active layer 23a may include a semiconductor such as silicon or a semiconductive oxide.

A gate insulating layer 20 is formed on the gate electrode 15, and a protective layer 40 is formed on the source/drain electrodes 33 and 35. The protective layer 40 may have a contact hole 43 through which the drain electrode 35 is exposed.

A light-passing pixel electrode is formed on the protective layer 40. The pixel electrode 50 may be composed of a transparent conductive material such as ITO or IZO and may be coupled to the drain electrode 35 through the contact hole 43.

The transistor Tr is not limited to the structure shown in FIG. 3, and may be changed into another structure.

The liquid crystal capacitor Clc uses the pixel electrode 50 and the associated common electrode 70 of the second substrate 61 as two opposed plates of that formed liquid crystal capacitor Clc. A liquid crystal layer 90 between the two electrodes 50 and 70 serves as a dielectric.

A lattice-shaped black matrix 63 may be formed on a rear surface of the second substrate 61. The black matrix 63 surrounds the area of each pixel P to cover light non-controlling areas including those of the gate lines G1 to Gn, of the data lines D1 to Dm, of the transistors Tr, etc.

Color filter patterns 66 arranged corresponding to the respective pixels P may exist inside openings of the black matrix 63, and a corresponding plurality of associated common electrodes 70 may exist beneath the corresponding color filter patterns 66.

In this case, the color filter patterns 66 may include red, green and blue color filter patterns R, G and B which are repetitively arranged in sequence.

Here, an overcoat layer (not shown) may be further formed between the color filter pattern 66 and the common electrode 70.

The positions and shapes and sizes of openings in the black matrix 63 and of the corresponding color filter patterns 66 may be changed. Therefore, in a case where the black matrix 63 and the color filter pattern 66 are formed at another position, the associated common electrodes 70 may be formed on an inner surface of the second substrate 61.

Like the pixel electrodes, the common electrodes 70 are formed of one or more transparent conductive materials. The common electrodes 70 may include other conductive materials such as opaque metal portions and/or thin and thus semi-transparent metal portions.

For example, the common electrodes 70 may be formed of indium tin oxide (ITO), indium zinc oxide (IZO), graphene, carbon nanotube, silver nanowires (AgNWs), etc.

Although it has been illustrated in FIG. 2 that the common electrodes 70 are positioned on the second substrate 61, the common electrodes 70 of alternate embodiments need not be positioned on the second substrate 61 and may instead be positioned on the first substrate 11.

In this latter case, the common electrodes 70 may be formed in the same layer as the pixel electrode s50 or may be formed in a different layer from the pixel electrodes 50, according to the alignment of the liquid crystal layer 90 and the patterning of the electrical fields to be formed as extending into the liquid crystal layer 90.

Meanwhile, a backlighting unit 300 configured to provide light may be positioned below the first substrate 11. The backlighting unit 300 may provide white light or selectively controlled red, green and blue lights. The backlighting unit 300 may be responsive to a blanking signal provided from the display controller 6 during a blanking period Pb, during which the backlighting unit 300 shuts off illuminating light that it otherwise provides to the integrated touch and display panel. The shut off of the illuminating light during the blanking period Pb is optional. In an alternate embodiment, the liquid crystals of the liquid crystal layer 90 are rotated to block the backlighting light during the blanking period Pb. In yet another embodiment, both operations can be carried out during the blanking period Pb, namely, shutting off of the illuminating light and rotating the liquid crystals of the liquid crystal layer 90 so they present a blackened image.

An image display operation of the LCD device configured as described above will be briefly described as follows.

First, if a gate-on signal is applied to the gate electrode 15 of the transistor Tr provided in a given pixel P, the active layer 23a is activated to become conductive. Accordingly, the source electrode 33 transfers a data signal applied thereto from a data line 30 to the corresponding drain electrode 35 via the then conductive active layer 23a.

In this case, the drain electrode 35 is electrically coupled to the pixel electrode 50 through the contact hole 43, and thus the voltage of the data signal is applied to and charges the pixel electrode 50. The applied voltage may be stored in the storage capacitor Cst provided in each pixel P.

Accordingly, the arrangement of liquid crystal molecules between the pixel and common electrodes 50 and 70 are controlled corresponding to a voltage corresponding to the difference between the voltage applied to the pixel electrode 50 and the voltage (e.g., Vcom) applied to the associated common electrode 70, thereby displaying a predetermined image.

In a general LCD device, the common electrodes 70 are all interconnected integrally whether formed on the entire lower surface of the second substrate 61 or alternatively formed on the first substrate 11 so that the same voltage is always applied simultaneously to all the common electrodes 70.

On the other hand, in the LCD device according to this embodiment, there are provided a plurality of individually driven common electrodes that are electrically separated from one another. Accordingly, the common electrodes 70 can be used not only to serve the needs of their associated light-controlling pixels but also as touch sensing electrodes of a mutual coupling type, capacitive touch sensor.

Referring to FIG. 4, the common electrodes 70 of the illustrated embodiment are patterned as elongated rectangles extending in the first direction (e.g., the X-axis direction, the row direction). At the same time a plurality of sense electrodes 72 are patterned as elongated rectangles in a different plane and extending along the second direction (e.g., the Y-axis direction, the column direction).

For example, the common electrodes 70 may be configured to include first to n-th common electrodes X1 to Xn. That is, a case where n common electrodes X1 to Xn exist has been shown as an example in FIG. 4. The individual widths of the first to n-th common electrodes X1 to Xn may correspond to widths of underlying pixel electrodes.

In the illustrated example, each sensing electrode 72 is positioned to be spaced apart from the common electrodes 70. Accordingly, the sensing electrode 72 can be operated, together with the common electrodes, as a capacitive touch sensor. (More specifically, a plurality of driving pulses Tp may be applied to one of the common electrodes 70 and capacitive coupling into a touching finger may allow those driving pulses Tp—or changes thereto—to be sensed in one of the crossing sensing electrode 72. Thus X and Y coordinates of the touch position may be determined.)

To this end, the sensing electrode 72 may be positioned on the second substrate 61 to intersect the common electrode 70.

For example, the sensing electrode 72 is formed long in the second direction (e.g., the Y-axis direction) so that a plurality of sensing electrodes can be disposed as spaced apart from one another along the first direction (e.g., the X-axis direction).

Thus, through the arrangement of the common electrodes 70 and the sensing electrode 72, mutual capacitance between the common electrode 70 and the sensing electrode 72 is formed at intersection portions of the common electrode 70 and the sensing electrode 72. Accordingly, each intersection portion at which the mutual capacitance is formed can be operated as a sensing cell 100 which implements touch recognition.

For example, the sensing electrode 72 may be formed of light-passing conductive materials such as ITO, IZO, graphene, carbon nanotube, AgNWs, etc.

The display controller 6 may receive an image signal DAT input from the outside of the LCD device, and an input control signal for controlling the display of the image data signal DAT. The display controller 6 may process the image data signal DAT to satisfy operational conditions and then provide the processed image signal to the data driver 4.

The display controller 6 may provide a data control signal DCS, together with the image signal DAT, to the data driver 4.

For example, the display controller 6 may receive input control signals such as a vertical synchronization signal Vsync, a horizontal synchronization signal Hsync, a main clock signal Mclk and a data enable signal DE, which are input from the outside of the LCD device, and output the data control signal DCS.

For example, the data control signal DCS may include a source start pulse SSP, a source shift clock signal SSC, a source output enable signal SOE, a polarity control signal POL, etc.

Correspondingly, the data driver 4 may receive the image signal DAT and the data control signal DCS, provided from the display controller 6, and responsively supply respective analog data signals corresponding to the image signal DAT respectively to each of the data lines D1 to Dm.

For example, the data driver 4 may supply the data signals to the pixels P, in synchronization with a gate-on signal Gon supplied during a display period Pd.

Meanwhile, the display controller 6 may provide the gate driver 3 with first and second clock signals CLK and CLKB for controlling the timing of actions taken by gate driver 3.

The display controller 6 may supply, to the gate driver 3, a scan start signal STV together with the clock signals CLK and CLKB.

The gate driver 3 may receive the clock signals CLK and CLKB and the scan start signal STV, provided from the display controller 6, and correspondingly supply respective gate signals respectively to the gate lines G1 to Gn.

The gate signal output from the gate driver 3 may include a gate-on signal level Gon to which the transistor Tr included in each pixel P will respond by being turned on, and a gate-off signal level Goff to which the transistor Tr will respond by being turned off.

For example, the gate driver 3 may progressively and sequentially supply the gate-on signal level Gon to the gate lines G1 to Gn during the display period Pd.

Thus, if the gate-on signal Gon is progressively supplied to the gate lines G1 to Gn, pixels P are progressively selected for each line, and the selected pixels P can receive the data signal transferred from the data lines D1 to Dm.

In this case, the first clock signal CLK and the second clock signal CLKB may have phases opposite to each other.

The gate driver 3 may output the gate-off signal Goff to the gate lines G1 to Gn during a blanking period Pb. The blanking period Pb may be one in which the backlighting unit (300) stops providing backlighting so that the user is subjected to a momentary black frame in between exposure to successive, illuminated frames. The blanking period Pb may alternatively or additionally be one where the pixels of the display area are all commanded to display a black or relatively dark gray scale.

The display period Pd and the blanking period Pb may be alternately repeated.

The common electrodes driver 5 performs a function of controlling the plurality of common electrodes 70.

In this case, during the blanking period Pb, the common electrodes driver 5 may be driven corresponding to a touch control signal CSS supplied from the touch controller 8.

More specifically, during the display period Pd, the common electrodes driver 5 may supply, to all the common electrodes 70, a common voltage Vcom for which each pixel P normally emits a light amount corresponding to its charged data signal.

Figure 7:
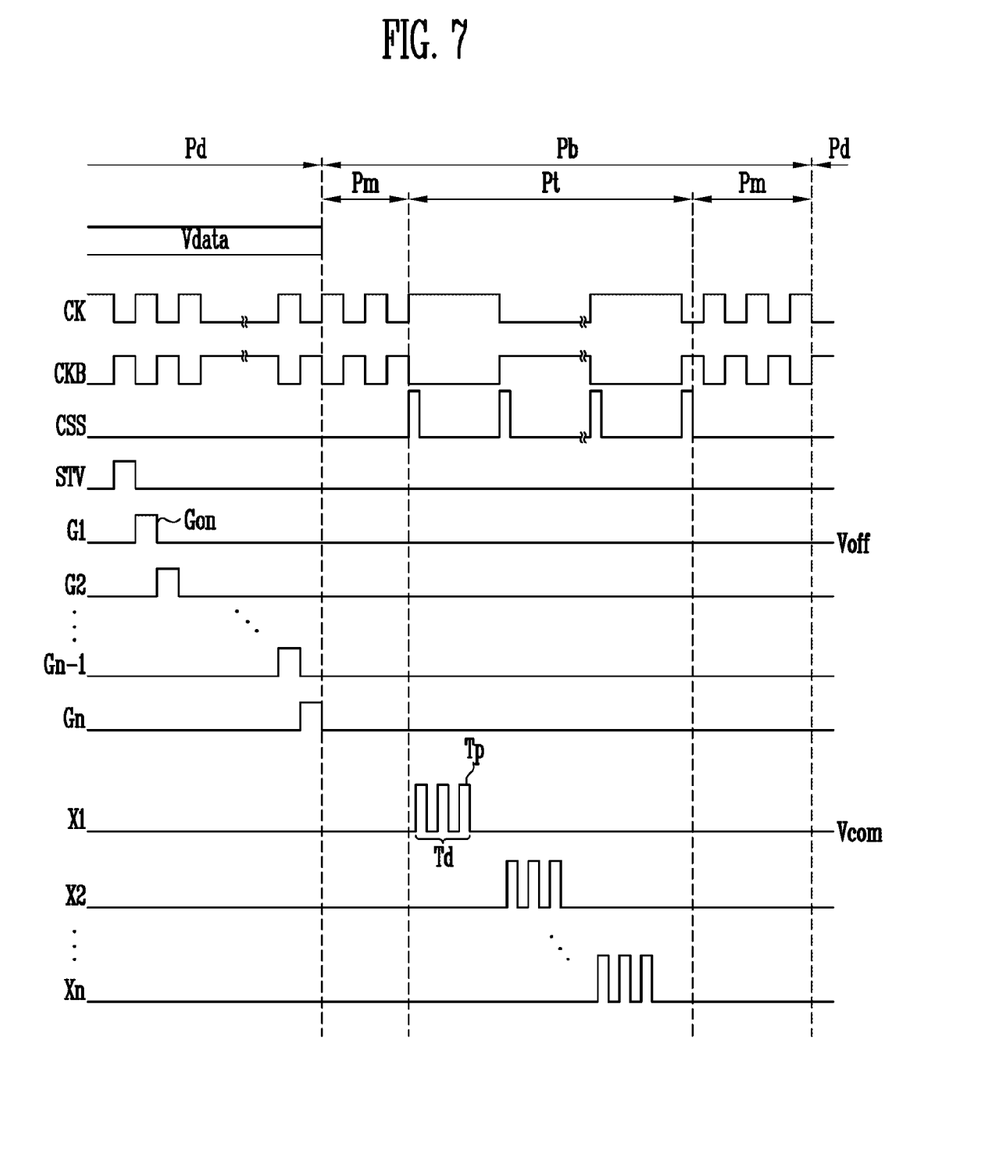
FIG. 7 is a waveform and timing diagram illustrating an operation of the LCD device according to an embodiment of the present disclosure of invention.

On the other hand, during the blanking period Pb, the common electrodes driver 5 may supply individualized touch driving signals Td respectively and successively to the common electrodes 70 (as shown in FIG. 7 for example) for thereby providing a touch sensing function during a touch driving subperiod Pt included within the blanking period Pb.

For example, the touch controller 8 may supply the touch control signal CSS to the common electrodes driver 5 during the touch driving period Pt, and the common electrodes driver 5 may progressively supply the touch driving signals Td to the common electrodes 70, corresponding to pulses of the touch control signal CSS.

The blanking period Pb may be divided into a touch driving subperiod Pt in which the touch control signal CSS is supplied, and one or more margin subperiods Pm in which the touch control signal CSS is not supplied.

Thus, the touch driving signal Td is supplied corresponding to the touch control signal CSS during the touch driving period Pt. The touch driving signal Td is not supplied during the margin period Pm.

In this case, the margin subperiod Pm may be positioned between the display period Pd and the touch driving period Pt.

The common electrode driver 5 may supply the common voltage Vcom to all the common electrodes 70 during the margin period Pm.

That is, since the touch control signal CSS is not supplied during the display period Pd and the margin period Pm, the common electrode 5 may apply the same common voltage Vcom to all the common electrodes 70 during the display period Pd and the margin period Pm.

The touch controller 8 may perform a function of controlling the common electrodes driver 5.

For example, the touch controller 8 may provide the touch driving signals Td to the common electrodes 70 by supplying the touch control signal CSS to the common electrodes driver 5 during the touch driving period Pt.

The touch controller 8 may detect a touch position, using respective signals output from the sensing electrodes 72. More specifically, and although not shown, the touch driving signals Td may be supplied to the respective common electrodes 70 first from one end of each common electrode, then from the opposed other end and optionally simultaneously from both ends. If a user's finger or another capacitive load is present along a portion of the length of a given one or more common electrodes 70, it will absorb some of the energy of the supplied touch driving signals Td at the location of touching and then the amount of signal received by sensing electrodes 72 located downstream of the signal absorbing point will be less than otherwise expected. Thus the location of touch may be determined based on which sensing electrodes 72 receive a capacitively coupled thereto touch driving signal Td having a smaller magnitude than expected when there is not touch by a user's finger. It is to be understood that this example is merely illustrative and not limiting of other techniques that may be used.

The touch controller 8 may also supply the touch control signal CSS to the display controller 6.

Although it has been illustrated in FIG. 1 that the display controller 6 and the touch controller 8 individually exist, the display controller 6 and the touch controller 8 may be integrated as one monolithically integrated component.

The display controller 6 may supply the first and second clock signals CLK and CLKB supplied to the gate driver 3, in synchronization with the touch control signal CSS.

The frequency of the first and second clock signals CLK and CLKB in the touch driving period Pt in which the touch control signal CSS is supplied may be different from that in the display period Pd.

For example, in a case where the first and second clock signals CLK and CLKB have a first frequency in the display period Pd, the first and second clock signals CLK and CLKB may have a second frequency different from the first frequency in the touch driving period Pt.

Figure 5:
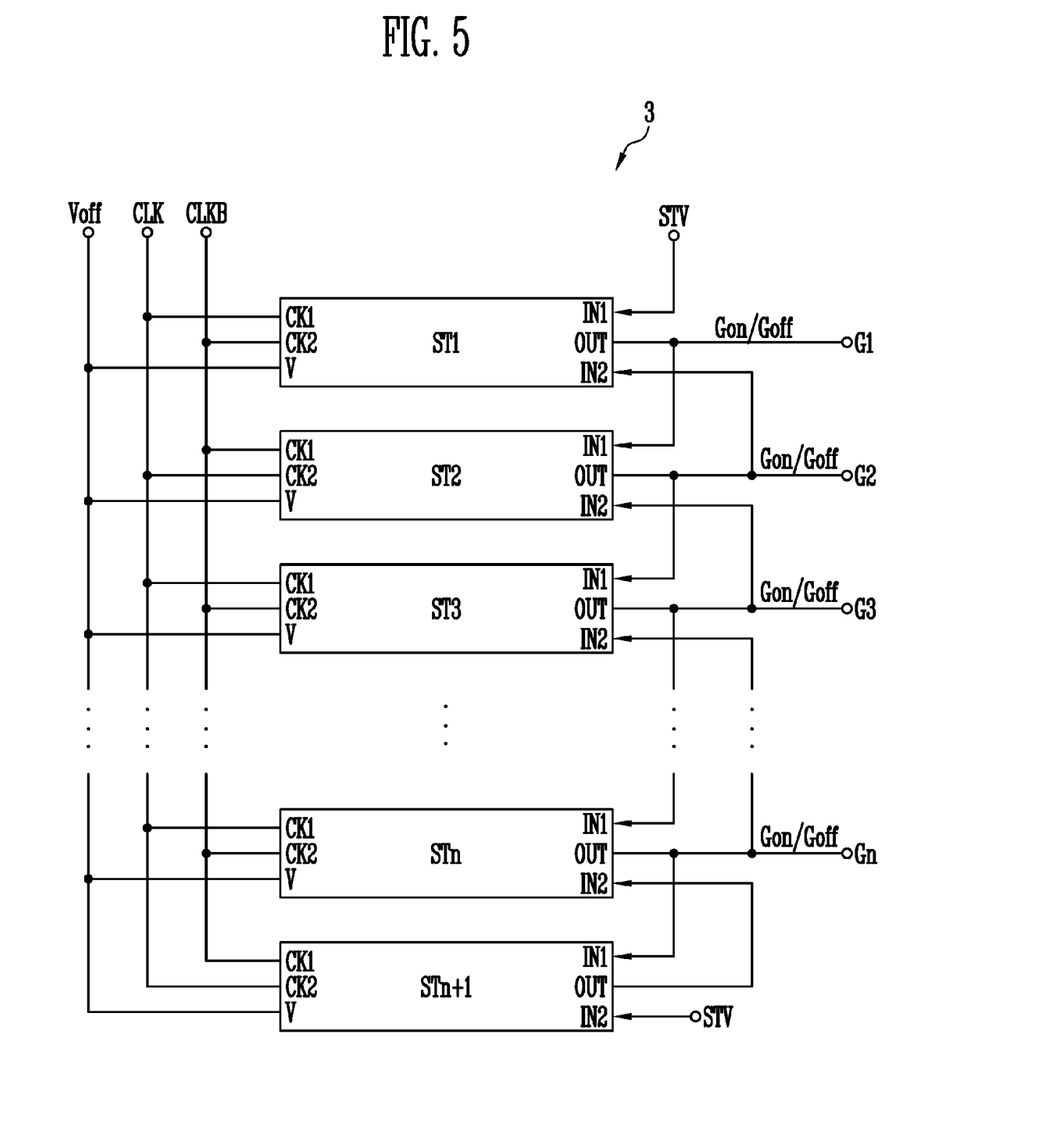
FIG. 5 is a schematic diagram of one embodiment of a gate lines driver shown in FIG. 1.

Since the touch control signal CSS is not supplied in the margin period Pm, the first and second clock signals CLK and CLKB can maintain the first frequency FIG. 5 is view illustrating an embodiment of the gate driver shown in FIG. 1.

Referring to FIG. 5, the gate driver 3 includes a plurality of stages ST1 to STn+1 which receive the first clock signal CLK, the second clock signal CLKB and the gate-off voltage Voff.

For example, the number of gate lines is n, the stages may be configured with n stages ST1 to STn corresponding to the respective gate lines and one dummy stage STn+1.

Each of the stages ST1 to STn+1 includes a first clock terminal CK1, a second clock terminal CK2, a voltage terminal V, a first input terminal IN1, a second input terminal IN2 and an output terminal OUT.

The output terminals OUT of the n stages ST1 to STn may be respectively coupled to the corresponding gate lines G1 to Gn.

The output OUT of the dummy stage STn+1 may be coupled to the second input terminal IN2 of the previous stage STn.

The clock signals CLK and CLKB supplied from the display controller 6 may be respectively input to the clock terminals CK1 and CK2 of each of the stages ST1 to STn+1.

For example, the first clock signal CLK may be input to the first clock terminal CK1 of an odd-numbered stage ST1, ST3, . . . , and the second clock signal CLKB may be input to the second clock terminal CK2 of the odd-numbered stage ST1, ST3, . . .

In addition, the second clock signal CLKB may be input to the first clock terminal CK1 of an even-numbered stage ST2, ST4, . . . , and the first clock signal CLK may be input to the second clock terminal CK2 of the even-numbered stage ST2, ST4, . . .

The gate-off voltage Voff may be input to the voltage terminal V of each of the stages ST1 to STn+1.

The gate-off voltage Voff is a voltage for which the respective transistor Tr included in each respective pixel P is turned off.

In this case, the gate-off voltage Voff may be set to a voltage of the gate-off signal Goff.

The scan start signal STV may be input to the first input terminal IN1 of the first stage ST1, and the gate-on signal Gon of the previous stage may be input to the first input terminal IN1 of each of the other stages ST2 to STn+1.

The gate-on signal Gon of the next stage may be input to the second input terminal IN2 of each of the n stages ST1 to STn.

The scan start signal STV or a separate control signal may be input to the second input terminal IN2 of the dummy stage STn+1.

Figure 6:
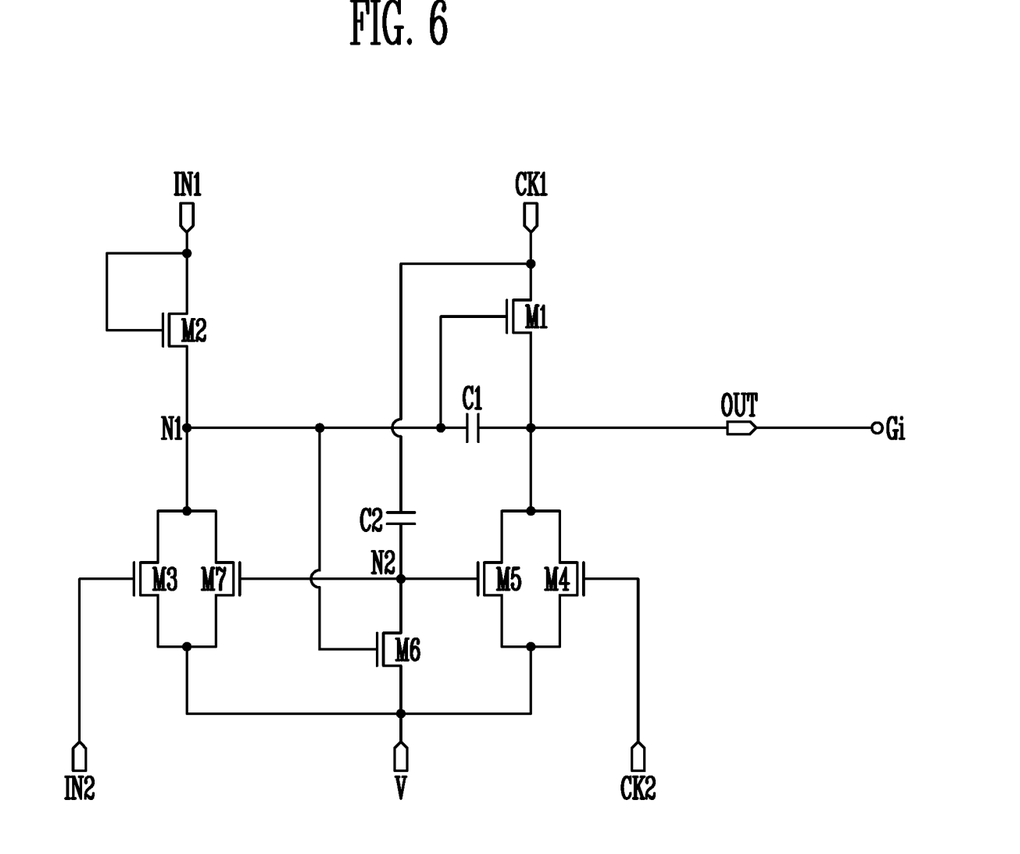
FIG. 6 is a circuit diagram illustrating an embodiment of one of the repeated stages shown in FIG. 5.

FIG. 6 is a circuit diagram illustrating an embodiment of the stage shown in FIG. 5.

Referring to FIG. 6, each of the stages ST1 to STn+1 may include first to seventh transistors M1 to M7 and capacitors C1 and C2.

The first transistor M1 is coupled between the first clock terminal CK1 and the output terminal OUT. A gate electrode of the first transistor M1 is coupled to a first node N1.

The second transistor M2 is coupled between the first input terminal IN1 and the first node N1. A gate electrode of the second transistor M2 is coupled to the first input terminal IN1.

The third transistor M3 is coupled between the first node N1 and the voltage terminal V. A gate electrode of the third transistor M3 is coupled to the second input terminal IN2.

The fourth transistor M4 is coupled between the output terminal OUT and the voltage terminal V. A gate electrode of the fourth transistor M4 is coupled to the second clock terminal CK2.

The fifth transistor M5 is coupled between the output terminal OUT and the voltage terminal V. A gate electrode of the fifth transistor M5 is coupled to a second node N2.

The sixth transistor M6 is coupled between the second node N2 and the voltage terminal V. A gate electrode of the sixth transistor M6 is coupled to the first node N1.

The seventh transistor M7 is coupled between the first node N1 and the voltage terminal V. A gate electrode of the seventh transistor M7 is coupled to the second node N2.

The first capacitor C1 is coupled between the first node N1 and the output terminal OUT.

The second capacitor C2 is coupled between the first clock terminal CK1 and the second node N2. In the illustrated example, the transistors are NMOS devices. Alternatively one or more of them can be PMOS devices provided the designed is changed to accommodate their differing behaviors.

FIG. 7 is a timing waveform diagram illustrating an operation of the LCD device according to the illustrated embodiment of the present disclosure. Particularly, a case where the common electrodes layer 70 is configured with first to n-th common electrodes X1 to Xn is shown in FIG. 7.

Referring to FIG. 7, the LCD device according to this embodiment may be operated in a period divided into a display period Pd and a blanking period Pb.

Preferably, the display period Pd and the blanking period Pb are alternately repeated.

The display period Pd refers to a period in which a predetermined image is displayed according to a data signal Vdata supplied to the pixels P.

The voltage of the common electrode 70 is maintained constant during the display period Pd so that the image is normally displayed. Therefore, the common voltage Vcom with the same amplitude may be supplied to all the common electrodes 70.

To this end, the common electrodes driver 5 may supply the common voltage Vcom with the same amplitude to each of the common electrodes 70 during the display period Pd.

The gate driver 3 may progressively supply the gate-on signal Gon to the gate lines G1 to Gn during the display period Pd.

To this end, the display controller 6 may supply the scan start signal STV to the gate driver 3 in an early stage of the display period Pd.

The display controller 6 may supply the first and second clock signals CLK and CLKB having a first frequency to the gate driver 3 during the display period Pd.

Preferably, the touch control signal CSS is not supplied during the display period Pd.

The blanking period Pb may include a touch driving subperiod Pt and one or more margin subperiods Pm.

The touch driving period Pt refers to a period in which the LCD device is driven as a capacitive touch sensor for the purpose of touch recognition. The common electrodes 70 may be used, together with the sensing electrodes 72, as forming a touch sensing matrix of crossing electrodes during the touch driving period Pt.

The margin subperiod Pm is a period which exists between the display period Pd and the touch driving period Pt. The touch control signal CSS is not supplied during the margin period Pm.

In addition, the gate-on signal Gon is not supplied during the margin period Pm.

The gate driver 3 may maintain the output of the gate-off signal Goff during the blanking period Pb. Thus, the gate lines G1 to Gn can maintain the gate-off voltage Voff during the blanking period Pb.

The display controller 6 may supply the first and second clock signals CLK and CLKB having the first frequency to the gate driver 3 during the margin period Pm.

Thus, the frequency of the clock signals CLK and CLKB in the display period Pd can be equal to that in the margin subperiod Pm.

In order to implement touch recognition during the touch driving period Pt, the touch driving signals Td may be progressively supplied to the plurality of common electrodes 70 one after the next.

For example, in a case where the common electrodes 70 are configured as the illustrated and rectangularly shaped first to n-th common electrodes X1 to Xn, the touch driving signal Td may be progressively supplied from the first common electrode X1 to the n-th common electrode Xn.

The touch driving signals Td, as shown in FIG. 7, may be each configured as including a plurality of driving pulses Tp, for example three pulses each.

In this case, the common electrodes driver 5, during the touch driving period Pt, may supply the touch driving signals Td to the respective common electrodes 70, corresponding to the touch control signal supplied from the touch controller 8.

During the touch driving period Pt, the display controller 6 may supply the first and second clock signals CLK and CLKB to the gate driver 3, in synchronization with the touch control signal CSS.

For example, the first and second clock signals CLK and CLKB, during the touch driving period Pt, may have a second frequency lower than the first frequency in the display period Pd.

Accordingly, the frequency of the clock signals CLK and CLKB can be lowered during the touch driving period Pt, so that it is possible to reduce the power consumption of the LCD device for the purpose of providing the touch sensing function, particularly when the resolution of the touch sensing function is not as fine as the resolution (e.g., pixels per inch) as that of the display function.

By way of summation and review, as user's demands on the convenience of inputs increase, a LCD device also requires a touch screen function that enables a user's command to be input by selecting an instruction content displayed on a screen with a user's hand or other signal altering object.

To this end, and conventionally, a separate touch sensor and a separate LCD device were individually manufactured and then the touch sensor was attached to (e.g., adhered onto) the separately fabricated LCD device.

However, in a case where the touch sensor is attached on an outer face of the LCD device, an adhesive layer may be required between the touch sensor and the LCD device, and a separate forming process of the touch sensor is required separately from that of the LCD device and alignment of the separately produced panels is required. Therefore, processing time and processing costs are increased while the danger of misalignment, improper gluing together, etc. increases and mass production yields may thus be lowered.

Accordingly, an LCD device that is monolithically integrated with its touch sensor, and in which the common electrodes simultaneously provide the touch sensing function and the display enabling function overcomes these problems.

In other words, the LCD device integrated with the touch sensor of the present disclosure of invention makes it possible to overcome the problems associated with separate panels and also makes it possible to reduce the power consumption of the LCD device due to the use of lower drive frequencies during the touch sensing period Pt.

While example embodiments have been disclosed herein, and specific terms have been employed, they are intended to be interpreted in a generic and descriptive sense and not for purpose of limitation. In some instances, as would be apparent to one of ordinary skill in the art in light of the present disclosure, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present teachings.

What is claimed is:

1. A liquid crystal display (LCD) device having monolithically integrated as a part thereof, a touch sensor, the LCD device comprising:
   a first substrate on which there is disposed a plurality of pixels respective coupled to respective ones of gate lines and data lines also formed on the first substrate;
   a plurality of electrically separate common electrodes configured to correspond to, and to be operative portions of respective subsets of the pixels, the common electrodes being integrally formed as part of the LCD device and extending longitudinally in a first direction;
   a plurality of sensing electrodes integrally formed as part of the LCD device and extending longitudinally in a second direction crossing with the first direction;
   a data lines driver configured to output respective data signals to respective ones of the data lines during an image forming portion of a display period;
   a gate lines driver including a plurality of stages configured for receiving first and second clock signals, wherein the gate lines driver outputs gate-on signals to the gate lines during the image forming portion of the display period, and outputs gate-off signals to the gate lines during a blanking period that is separate from the display period;
   a common electrodes driver configured to supply touch driving signals to the common electrodes during a touch driving subperiod included within the blanking period and in synchronism with a touch control signal;
   a touch controller configured to supply the touch control signal to the common electrodes driver during the touch driving subperiod; and
   a display controller configured to supply the first and second clock signals to the gate lines driver, in synchronization with the touch control signal, during the touch driving subperiod,
   wherein the display controller supplies the first and second clock signals as having a first frequency to the gate lines driver during the display period, and supplies the first and second clock signals as having a second frequency different from the first frequency to the gate lines driver during the touch driving subperiod.

2. The LCD device of claim 1 and configured to cause the blanking period and the display period to be alternately repeated.

3. The LCD device of claim 1, wherein the common electrodes driver supplies the same common voltage to the common electrodes during the display period.

4. The LCD device of claim 1, wherein the blanking period further includes one or more margin periods in which the touch control signal is not supplied.

5. The LCD device of claim 4, wherein at least one of the margin periods is positioned between the display period and the touch driving subperiod.

6. The LCD device of claim 4, wherein the display controller supplies the first and second clock signals as having the first frequency to the gate lines driver during at least one of the margin periods.

7. A liquid crystal display (LCD) device having monolithically integrated as a part thereof, a touch sensor, the LCD device comprising:
   a first substrate on which there is disposed a plurality of pixels respective coupled to respective ones of gate lines and data lines also formed on the first substrate;
   a plurality of electrically separate common electrodes configured to correspond to, and to be operative portions of respective subsets of the pixels, the common electrodes being integrally formed as part of the LCD device and extending longitudinally in a first direction;
   a plurality of sensing electrodes integrally formed as part of the LCD device and extending longitudinally in a second direction crossing with the first direction;
   a data lines driver configured to output respective data signals to respective ones of the data lines during an image forming portion of a display period;
   a gate lines driver including a plurality of stages configured for receiving first and second clock signals, wherein the gate lines driver outputs gate-on signals to the gate lines during the image forming portion of the display period, and outputs gate-off signals to the gate lines during a blanking period that is separate from the display period;
   a common electrodes driver configured to supply touch driving signals to the common electrodes during a touch driving subperiod included within the blanking period and in synchronism with a touch control signal;
   a touch controller configured to supply the touch control signal to the common electrodes driver during the touch driving subperiod; and
   a display controller configured to supply the first and second clock signals to the gate lines driver, in synchronization with the touch control signal, during the touch driving subperiod, wherein each stage of the gate lines driver includes:
   a first transistor coupled between a first clock terminal and an output terminal, the first transistor having a gate electrode coupled to a first node;
   a second transistor coupled between a first input terminal and the first node, the second transistor having a gate electrode coupled to the first input terminal;
   a third transistor coupled between the first node and a voltage terminal, the third transistor having a gate electrode coupled to a second input terminal;
   a fourth transistor coupled between the output terminal and the voltage terminal, the fourth transistor having a gate electrode coupled to a second clock terminal;
   a fifth transistor coupled between the output terminal and the voltage terminal, the fifth transistor having a gate electrode coupled to a second node;
   a sixth transistor coupled between the second node and the voltage terminal, the sixth transistor having a gate electrode coupled to the first node; and
   a seventh transistor coupled between the first node and the voltage terminal, the seventh transistor having a gate electrode coupled to the second node.

8. The LCD device of claim 7, wherein each stage of the gate lines driver further includes:
   a first capacitor coupled between the first node and the output terminal; and
   a second capacitor coupled between the first clock terminal and the second node.

9. The LCD device of claim 8, wherein the first and second clock signals are respectively input to the first and second clock terminals of an odd-numbered stage, and
   wherein the second and first clock signals are respectively input to the first and second clock terminals of an even-numbered stage.

10. The LCD device of claim 9, wherein a scan start signal or the gate-on signal of a previous stage is input to the first input terminal, and wherein the gate-on signal of a next stage is input to the second input terminal.

11. The LCD device of claim 10, wherein a gate-off voltage is applied to the voltage terminal.

12. The LCD device of claim 1, wherein the second frequency is a frequency lower than the first frequency.

13. The LCD device of claim 1, wherein the first and second clock signals have phases opposite to each other.

14. The LCD device of claim 1, wherein the common electrodes are positioned on either the first substrate or on a second substrate that faces but is spaced apart from the first substrate.

15. The LCD device of claim 1, further comprising a backlighting unit positioned to supply backlighting from below and into the first substrate.

16. The LCD device of claim 1, further comprising a liquid crystal layer positioned between the first substrate and a second substrate that is provided to face but be spaced apart from the first substrate.

17. The LCD device of claim 1, wherein the common electrodes and the sensing electrodes respectively include respective light-passing materials.

* * * * *